Feb. 1, 1966
L. H. PERRY
3,232,641
PACKING FOR FLUID COUPLING JOINT
Filed July 27, 1962
2 Sheets-Sheet 1
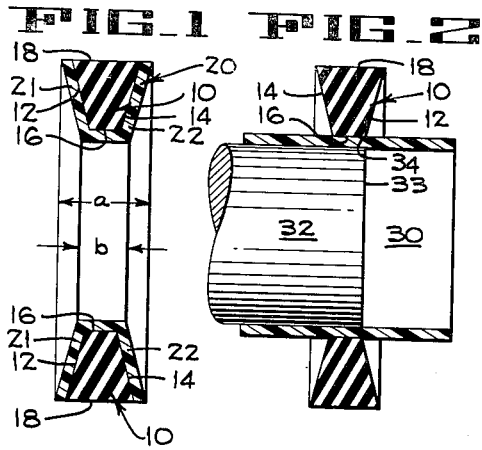
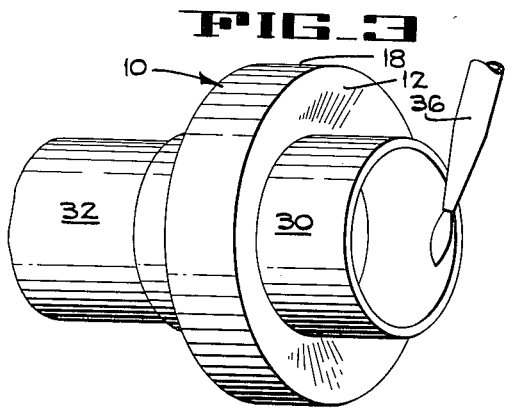
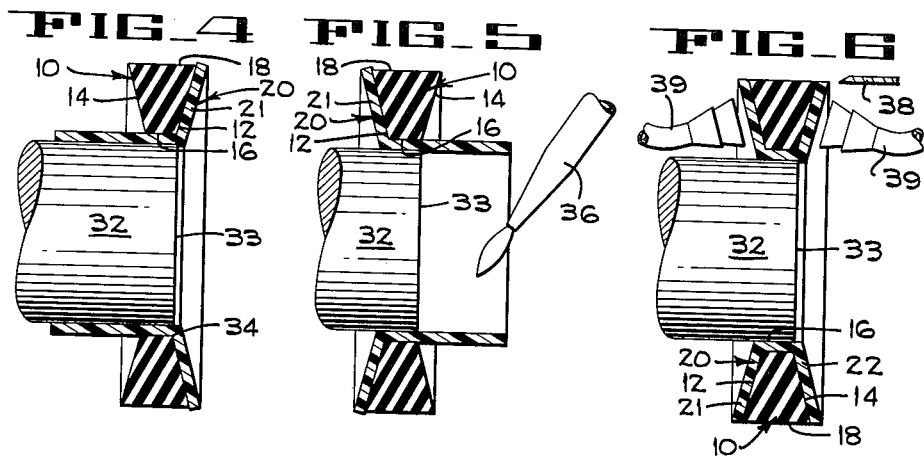
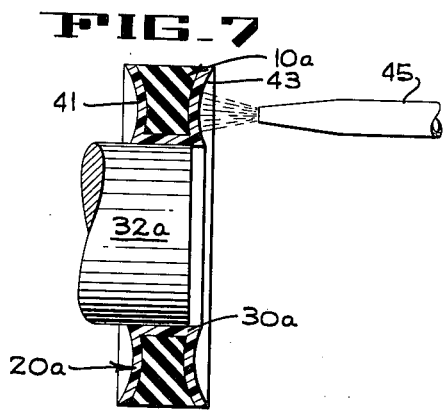
INVENTOR
LANDIS H. PERRY
BY *Hans F. Hoffmeister*
ATTORNEY

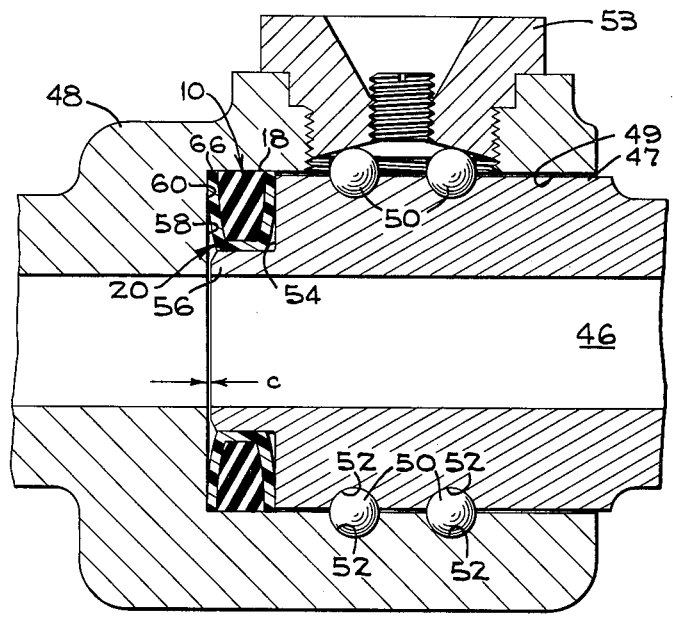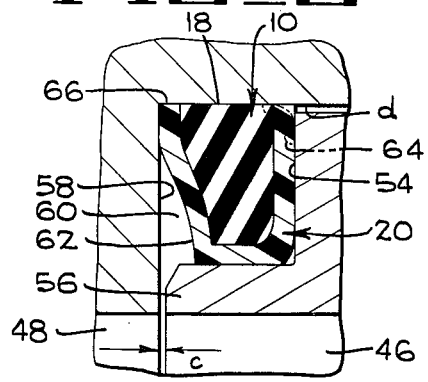

United States Patent Office 3,232,641
Patented Feb. 1, 1966

3,232,641
PACKING FOR FLUID COUPLING JOINT
Landis H. Perry, Newport Beach, Calif., assignor to FMC Corporation, San Jose, Calif., a corporation of California
Filed July 27, 1962, Ser. No. 212,809
8 Claims. (Cl. 285—98)

This invention relates to seals and packings for use in forming fluid-tight pipe joints of the fixed or swivel type.

The seals or packings concerned should be able to form reliable and highly efficient joints capable of retaining their properties over substantial ranges of temperature and pressure and, moreover, be capable of handling hydrocarbon and other fluids which attack normal elastomeric packing materials. It should be noted that the seal or packing of this invention is not of the gasket type which relies on high clamping forces between fixed joint parts for its effective operation.

Efficient packings which are not only simple in construction and easy to replace, but which also have the versatility of application above-mentioned are notoriously difficult to produce. The reason lies, primarily, in the fact that no single economical material which has the necessary resilience, tensile strength, impermeability, chemical inertness, and temperature stability is available for use in fluid seals or packings.

The problem is further accentuated for swivel joint packings because of two facts: the dimensions of the chamber in which the packing is housed have considerable tolerances dependent upon the manner in which the two parts of the joint are formed and held together; and the packing must have low torque characteristics at all, but especially low, fluid pressures. In general, the cost of a swivel joint (such as that illustrated in FIGURE 8 of the accompanying drawings) depends very largely upon the tolerances which must be held in the packing chamber, and the tolerances themselves are determined by the type of packing. On the other hand, it is, and has been for many years, common practice to employ what may be termed "hydraulic" packings in swivel joints as well as in fixed joints; hydraulic packings being those of U-shaped or V-shaped cross section, which depend for their sealing function upon the admission of fluid pressure therebehind. In swivel joint applications, the effectiveness of such packings often depends upon accurately formed seal chambers but, almost without exception, hydraulic packings tend to bind under high pressures and, since they rely for their operation upon the admission of fluid to the packing chamber and to the annular space defined by the concave section of the seal, any chemically sensitive energizer housed within said annular space will be damaged.

In known cases where attempts have been made to protect chemically sensitive energizers from the fluid being sealed by means of a chemically inert liner, frequent failures have resulted from difficulties arising in the fabrication of the liner which, after short periods of use, is punctured or split. Even while the liner stands up to the mechanical stresses involved and successfully protects the energizer from chemical degeneration, the sealing function of the packing as a whole has been unsatisfactory because of wrinkling or creasing of the seal liner under stress. It should be noted, that in this specification the term "energizer" is used, as is generally understood in the art, to mean: the material, mechanism or device by which a packing is pressed into initial sealing contact with the chamber wall without relying upon fluid pressure, so that, when fluid pressure is subsequently applied to the joint a good seal is effected without initial leak.

It is therefore an object of this invention to provide an improved seal or packing suitable for use in fixed or swivel pipe joints which is free from one or more of the above mentioned disadvantages.

Another object is to provide a packing that will form an effective and efficient fluid tight seal and which, while including an energizer, will not be subject to chemical degeneration or attack by the fluid being sealed.

Another object is to provide a packing for use in a swivel joint which will not require high packing chamber tolerances to be maintained.

Another object is to provide a swivel joint seal which will allow the swivel joint to move with relative ease under all internal pressures which can be handled.

Another object is to provide a seal or packing which, although clamped tightly within a sealed chamber, will not leak because of wrinking at the sealing surfaces.

Another object of the invention is to provide a novel packing or seal in which a chemically resistant and homogeneous liner is formed about a chemically sensitive resilient energizer.

Another object of the invention is to provide a swivel joint which is capable of efficiently conducting hydrocarbon fluids within a wide range of temperatures and pressures.

Further objects and advantages of this invention will become apparent from the following description of particular forms thereof. In the following description reference will be made to the accompanying drawings in which:

FIGURE 1 is a diametrical section of an annular seal or packing formed in accordance with the invention.

FIGURE 2 is a similar section showing the seal components on a mandrel prior to forming.

FIGURE 3 is a semi-diagrammatic perspective of the seal components mounted on the mandrel in the initial stages of forming the seal.

FIGURE 4 is a view similar to FIGURE 2 showing the seal as it appears when half formed.

FIGURE 5 is a similar view to FIGURE 4 but indicates the next stage in seal formation.

FIGURE 6 is another diametrical section of the seal and mandrel indicating the final trimming and finishing of the seal.

FIGURE 7 is a similar view to FIGURE 6 but illustrates a seal of slightly different section.

FIGURE 8 is a longitudinal section of a typical swivel joint showing a packing of the type illustrated in FIGURES 1 to 6 in use.

FIGURE 9 is an enlarged section of the seal chamber and packing of the swivel joint of FIGURE 8 illustrating the effects of high fluid pressure.

Referring particularly to FIGURE 1, it will be noted that the seal of packing ring comprises an annular resilent energizer ring 10 covered on its radial end faces 12 and 14 and its internal peripheral surface 16 (but not its outer peripheral surface 18) by a liner 20. The outer peripheral edges 21 and 22 of the liner 20 are finished so as to lie flush with the outer peripheral surface 18 of the energizer 10, the whole thereby forming a ring of an isosceles trapezoidal section because the width of the surface 16 is less than that of the surface 18. Otherwise expressed, the over-all width (a) of the packing at its outside diameter is considerably larger than the width (b) at its inside diameter.

The energizer 10 may be formed from a highly-resilient elastomeric material which can be premolded to the correct shape or formed as a strip which is coiled to the correct diameter and joined. The material of the energizer should be selected primarily for its resilience and its temperature characteristics, and no particular attention need be paid to its sealing qualities, tensile strength or to its chemical sensitivity to the fluid being sealed. Thus, elastomeric materials and natural or synthetic rubbers are suitable. On the other hand, the material of the liner is selected for its chemical inertness, physical strength, and lubricious properties as well as its temperature characteristics and, although the liner should be deformable under the temperatures concerned, it need not have the resilience or deformability of the energizer. Many polymeric plastics are therefore suitable liner materials. If the liner is to be shaped around the energizer by the method to be subsequently described, it must be a thermo-plastic substance which will flow freely only at relatively high temperatures, for example, 500° F. To take a typical example, if petroleum products are being handled under pressures under 300 lbs./sq. in. and within the temperature range of −120 to 350° F., a suitable liner material would be Teflon (registered U.S. trademark) or polyethylene, and a suitable energizer material would be Silastic (registered U.S. trademark).

Since it is evident that the advantages of the packing of the present invention depend, not only upon its shape and the materials employed, but also upon the method by which it is manufactured, a method of manufacture which has given excellent results will now be described with reference to FIGURES 2–7 of the accompanying drawings.

For simplicity of description, it will be assumed that the elastomeric energizer 10 has been molded into a continuous, homogeneous ring having the cross section above described (rather than having been formed by coiling an extruded strip as may, in fact, be done for economy). It is important, however, that the liner 20 be continuous and free from voids, joints or imperfections which may leak and allow the fluid to penetrate into the elastomeric energizer 10; consequently, the liner is formed from a continuous, homogeneous tube of thermoplastic material. The thickness of the tube wall need not be, in principle, any greater than that needed to form a fluid-impervious barrier, and, with the above mentioned materials, it might be only a few thousandths of an inch. However, liners of that thickness would be subject to puncture and damage during handling, and when used in a swivel joint, would wear out quickly so that, in fact, liner thicknesses of the order of .05 to .1 inch are used for seals of internal diameter from 1 to 2 inches. On the other hand, liners which are too thick in relation to the size of the joint and the bulk of the energizer prevent the energizer from working the liner into an effective seal with the joint parts.

With specific reference to FIGURES 2–6 of the accompanying drawings, it will be noted that the thermoplastic liner tubing 30 has the same nominal internal diameter as the finished packing ring and is pushed forwardly over a mandrel 32 which is of such diameter that a firm fit is obtained. The tube 30 is not pushed fully onto the mandrel 32, but only so far that a length slightly greater than the length of the radial end face (12 or 14) of the energizer 10 remains projecting beyond the end of the mandrel. The energizer 10 is then pushed forwardly over the outside surface of the tube 30 so that the near internal peripheral edge 34 lies in substantially the same plane as the forward end 33 of the mandrel 32. Again, the energizer ring should be a firm fit over the liner tube so that its position will not alter during the subsequent forming operations.

When the liner tube 30 and the energizer ring 10 have been fitted over the mandrel 32, the assembly is rotated with and by the mandrel and heat is applied to the unsupported portion of the liner tube which projects beyond the end of the mandrel. One way in which the heat may be applied is illustrated in FIGURE 3 where the flame of a gas torch 36 is shown being applied to the inner surface of the portion of the tube that projects beyond the mandrel. The torch 36 is played evenly over the surface of the exposed portion of the liner tube 30 so as to heat this portion substantially uniformly and to allow the end of the tube to flare outwardly under centrifugal force until it makes intimate and uniform contact with the radial face 12 of the energizer ring 10 as illustrated in FIGURE 4. The partly formed sealing or packing ring is then removed from the mandrel, reversed, and placed back on the mandrel so that the other end of the tube 30 projects past the end of the mandrel 32 as previously described for the first end.

As indicated in FIGURE 5, the reversed liner tube 30 and elastomer ring 10 are again rotated by the mandrel and heat is applied to the exposed end of the liner tube so that it is flared outwardly as before and forms intimate contact with the other radial surface 14 of the elastomer ring 10. Finally, while the packing ring and mandrel are still rotating, the outer peripheral edge 18 of the packing ring is trimmed, as by a knife 38, and the outer radial faces of the liner are burnished or flame-finished to remove any defects, irregularities or blemishes in these faces, as by torches 39 (see FIGURE 6).

While it is important, as will be subsequently explained, to ensure that the width of the inner peripheral face ($b$) is substantially less than the outer peripheral face ($a$) and this consideration places limitations on the possible sections of the packing ring, other sections and shapes of ring may be formed beside that described and illustrated with respect to FIGURES 1 to 6. For example, in certain applications, greater sealing efficiency can be obtained with a packing ring having the shape illustrated in FIGURE 7.

In FIGURE 7, a packing is shown in the final stages of being formed and, as before, the shape of the elastomer ring determines the shape of the finished packing. An elastomer ring 10a is employed which has a section that may be regarded as an isosceles trapezoid wherein the radial faces are concave instead of linear. A liner 20a has been formed from a tube 30a on a rotating mandrel 32a as described for the packing shown in FIGURE 1. However, at least the final stages of forming each radial side portion of the liner 20a should be accomplished by directing jets of hot gases under pressure, as by a nozzle 45, onto each radial face 41 and 43. This procedure ensures intimate contact between the liner and the elastomer at all points and such contact could not be obtained if only centrifugal forces were relied upon as in the previous example.

To illustrate one application of a seal or packing formed as above described with respect to FIGURES 1 to 6, a common type of swivel joint with packing installed is illustrated in FIGURE 8 and the enlarged section of the seal chamber and packing of FIGURE 9 indicates effects of pressure on the packing of this invention. The mechanical features of the joint illustrated in FIGURE 8 are old and well known in the art having been described in detail in patents such as the Allen Patent No. 2,330,197. The details of construction of such joints will not, therefore, be thoroughly described herein.

The swivel joint illustrated in FIGURE 8 has two principal parts; a tubular spigot member 46 having one end machined to form a cylindrical outer periphery 47, and a tubular flange member 48 having a counterbore 49 formed to receive the machined end of the spigot member. The two members, when placed together, are located axially by a plurality of balls 50 that run in two pairs of races 52 formed in the periphery 47 of the spigot member and the counterbore 49 of the flange member. The balls 50 are inserted into the races, when aligned, by removing the screwed plug 53 and are held in place by re-inserting the plug. Thus, the members 46 and 48 may rotate with respect to one another and are secured against axial movement with respect to each other. It will be noted, however, that the inner end of the spigot member is stepped to form a radial face 54 and an annular projection 56, and, also, that the counterbore 49 terminates in a radial face 58 which is spaced a distance "c" from the inner end of the spigot member. Thus, an annular seal chamber 60 is defined between projection 56 and counterbore 49 and between the radial faces 54 and 58.

In commercial swivel joints the dimension "c" may vary considerably and, provided the tolerances are known, a packing formed in accordance with this invention may be used. If the radial height of the seal chamber 60 and its tolerances are known, as well as the axial width, the correct packing ring may be selected by choosing one having a radial height equal to the mean value of the radial height of the chamber and an axial width (at the outer peripheral edge) which is somewhat greater than the largest possible axial width of the seal chamber 60. Care should be taken to select a packing ring which has a smaller axial width ($b$) which is significantly less than the minimum possible axial width of the packing chamber. In this way, therefore, the packing ring will fit snugly in place within the portion of the seal chamber formed by the counterbore 49 so that the spigot member 46 can be pressed into position without damaging the inner sealing face of the packing ring. In order to bring the ball races 52 into register so that the balls 50 can be inserted thereinto, the joint members 46 and 48 must be pressed together in the axial direction to compress the packing ring axially. The packing will therefore take the general shape indicated in FIGURE 8 when the joint is assembled. Therefore, the natural resilience of the energizer 10 effects the initial seal of the liner 20 with the walls of the seal chamber 60 and prevents low pressure fluid from passing the liner.

Referring now in detail to FIGURE 9 of the accompanying drawings, it will be noted that the action of the packing ring of the present invention under high pressure is quite different from that of a conventional hydraulic packing of cup or U-shape. The high pressure fluid conducted by the joint penetrates through the space "c" between members 46 and 48 into the seal chamber 60 and acts on the exposed face 62 of the liner 20 to press the seal or packing bodily to the right (in FIGURE 9). However, because the elastomeric material of the energizer 10 is substantially incompressible, the internal pressure in the energizer will be approximately the same at all points and, as a result, the liner is pressed firmly against the projection 56 and against the radial face 54 which define part of the seal chamber; it is to be understood, of course, that the energizer does have limited compressibility, since, as explained above, and as illustrated in FIGURES 8 and 9, the packing ring is compressed axially when it is assembled in the swivel joint and subsequently when it is subjected to fluid pressure. Therefore, the seal ring will take up a shape approximately as shown in FIGURE 9 but, if the pressures are increased over about 1000 lbs./sq. in., a metallic anti-extrusion ring 64 (shown in phantom lines) should be incorporated in the packing ring to prevent the extrusion of the packing ring into the space "d" between the joint members.

It can be seen, from the manner in which the packing ring is deformed under pressure, that at no time does the fluid which flows in the joint come into contact with the elastomeric energizer 10. Under low pressures, as illustrated in FIGURE 8, the initial compression of the packing ring within the seal chamber prevents the fluid being sealed from creeping under the peripheral lip 66 of the liner 20, and while under high pressures, as illustrated in FIGURE 9, the fluid pressure itself presses the liner lip 66 firmly into contact with the counterbore 49 to prevent fluid from gaining access to the energizer 10. As previously indicated, the liner material is chosen not only for its good sealing qualities but also for its self-lubricating qualities and it has been found that, with the materials mentioned, the packing ring will not rotate with respect to the flange member 48 since it is held in firm frictional engagement therewith by the outer face 18 of the energizer 10. This feature further enhances the sealing engagement of the liner lip 66 with the flanged member 48 so that the danger of degeneration of the energizer material by the fluid being sealed is practically eliminated.

While one or more particular forms of the invention have been described by way of example and illustration only, it should be understood that the scope of this invention should not be determined or limited by reference to the foregoing description since the packing ring is capable of modification and variation without departing from the principles of the invention, and since the scope of the invention can only be limited by the scope and proper interpretation of the claims appended hereto.

The invention having thus been described, that which is believed to be new and for which protection by Letters Patent is desired is:

1. For use in a swivel joint having relatively rotatable inner and outer axially extending walls, and relatively rotatable radially extending forward and rear walls, said walls forming a chamber; a packing ring for use within said chamber, said packing ring comprising a fluid impervious, substantially chemically inert liner of plastic sheet material having a low coefficient of friction and having substantially uniform thickness, said liner having an annular intermediate flange for frictional sealing engagement with said inner wall, a first annular side flange for frictional sealing engagement with said rear wall, and a second annular side flange for frictional sealing engagement with said forward wall, said side flanges being integrally connected to and diverging outward from the intermediate flange in a direction extending away from the axis of the ring so that said side flanges are in confronting relation to each other; and an energizer body of resiliently compressible material between said side flanges and having an annular inner wall in contact with said intermediate flange, an annular outer wall for frictional engagement with said axial outer wall and opposite side walls diverging from said inner wall and being in contact with said side flanges so that the entire confronting surfaces of the flanges and the body are in intimate contact with each other, said side flanges being resiliently compressible toward each other, said body being dimensioned for resiliently urging of said side flanges against their associated forward and rear chamber walls and resilient resisting of movement of said side flanges towards each other said frictional engagement of said body with said outer axial wall of said chamber being greater in magnitude than the combined frictional engagement of said second annular flange with said forward wall and said intermediate flange with said inner axial wall of said chamber.

2. In a fluid coupling joint including relatively rotatable interconnected first and second tubular members circumscribing a flow passage therethrough, said first and second members respectively having spaced confronting rear and front annular surfaces generally radially related to said flow passage and one of said members having an outer annular surface extending between said radial surfaces, said surfaces thereby defining an annular chamber circumscribing said flow passage and opening thereinto, a packing comprising a liner of fluid impervious material, said liner having an axially extending annular flange and axially spaced first and second annular flanges integral with said axial flange and diverging outward therefrom, said first flange having an inner portion joined to said axial flange and an outer portion terminating in a peripheral edge, said liner being positioned in said chamber with the axial flange of the liner circumscribing said flow passage, with said peripheral edge engaging said outer annular surface, with said outer portion of said first flange engaging said rear surface of the first member, with said inner portion of said first flange being axially spaced from said rear surface, and with said second flange frictionally engaging said front surface of the second member, said first and second flanges being flexed toward each other by said first and second members; and resilient means between and engaging said first and second flanges, and between and engaging said axial flange and said outer annular surface, said resilient means being resilieintly compressed by the interconnection of said first and second members, said resilient means being dimensioned to resiliently urge said second flange against said front surface with a first frictional force, to resiliently urge said outer portion of said first flange against said rear surface with a second frictional force, and to resiliently urge said resilient means against said outer annular surface with a third frictional force, said third frictional force being greater than said first frictional force, said resilient means also being responsive to the application of fluid pressure from the flow passage against the liner for even more tightly urging said second flange against said front surface and said outer portion of the first flange against said rear surface.

3. The joint of claim 2 wherein said resilient means is an annular body of resiliently compressible material having a trapezoidal radial cross-section and being complementarily fitted within said liner, said body having an inner wall engaging the axial flange of the liner and outwardly diverging walls engaging the first and second flanges of the liner, said body being held under compression by the interconnected first and second members.

4. The joint of claim 2 wherein said second flange has an outer portion engaging said front surface and an inner portion axially spaced from said front surface.

5. In a fluid coupling joint providing a flow passage and a chamber circumscribing and communicating with the passage, said joint including first and second relatively rotatable confronting walls and an intermediate wall between said confronting walls which walls define said chamber, said first wall being stationary relative to said intermediate wall, a packing comprising a fluid impervious, substantially chemically inert liner of non-elastomeric sheet material having a low coefficient of friction and of substantially uniform thickness, said liner being positioned in said chamber in circumscribing relation to the passage, said liner including an intermediate annular flange extending generally parallel to said intermediate wall and a pair of annular side flanges integrally connected to and projecting from the intermediate flange alongside of said confronting walls and terminating in annular end edges radially spaced from said intermediate flange; and an annular energizing means positioned between said side flanges in circumscribing relation to said passage, said energizing means being resiliently urged into frictional engagement with said intermediate wall, said energizing means being dimensioned to resiliently urge said edges of the side flanges into fluid tight frictional engagement with said confronting walls, said energizing means coacting with said side flanges and walls so that the frictional engagement of said energizing means with said intermediate wall is greater than the frictional engagement of the side flange in engagement with said second side wall and the maximum pressure exerted by said energizing means against said side flanges is exerted along said edges of the side flanges, said energizing means including an annular portion extending between said side flanges for limiting movement of the side flanges toward each other when the packing is subjected to fluid pressure from the flow passage whereby said edges remain in fluid tight engagement with said confronting walls.

6. In a fluid coupling joint including relatively rotatable interconnected first and second tubular members circumscribing a flow passage therethrough, said first member having a predetermined rear annular radial surface which is radially related to said flow passage and an outer annular surface extending axially from said radial surface, said second member having radially and axially extending annular surfaces respectively in spaced confronting relation to the radial and axial surfaces of said first member, the axial surface on said second member being spaced inward of said outer axial surface, said surfaces thereby defining an annular chamber circumscribing said flow passage, there being a fluid leakage path communicating with said flow passage and opening into said chamber between said rear and inward surfaces; a packing comprising a liner of fluid impervious material in said chamber, said liner having an axially extending annular flange in circumferential engagement with said inward surface, a first annular flange integral with said axial flange and projecting outwardly therefrom, and a second annular flange integral with said axial flange and projecting outwardly therefrom, said first annular projecting flange having an inner portion joined to said axial flange and an outer portion terminating in a peripheral edge that engages said outer axial surface of said first member, said outer portion of said first annular projecting flange engaging said rear surface of the first member, said inner portion of said first annular projecting flange being spaced from said rear surface; said second annular projecting flange having an outer portion engaging the radial surface of said second member and terminating in a peripheral edge engaging the outer axial surface of said first member; said annular projecting flanges diverging outward from said axial flange in their unstressed condition; and an annular body of resilient material in said chamber on the other side of said liner from said rear surface of said first member and radial and axial surfaces of said second member, said body being held under compression by interconnection of said members, said body having rear, inner, outer and front walls respectively engaging the radial flange that is adjacent to said rear surface, said axial flange, said axial surface of said first member, and said second annular projecting flange, said diverging flanges being moved into closer spaced relation than in said unstressed condition by interconnection of said members, said walls being pressed against their respective flanges and surface by said compression of the body and the resiliency thereof, said body being dimensioned to resiliently force said axial flange against said inward surface with a first frictional force, to resiliently force said second annular projecting flange against said radial surface of said second member with a second frictional force, and to force said outer wall against said outer axial surface of said first member with a third frictional force, said third frictional force being greater in magnitude than the first and second frictional forces combined, thereby precluding movement of fluid that enters the chamber through said leakage path, between arms of said flanges and their respectively engaged surfaces thus isolating said body from said fluid and causing said body and said liner to remain substantially stationary with respect to said first member when said members rotate.

7. The joint of claim 6 wherein said resilient means is an annular body of resiliently compressible material positioned in said chamber and held under compression by interconnection of said members, said body having rear, inner and outer walls respectively engaging said projecting flange of said liner, said axial flange of said liner, and said outer axial surface of said first member, said walls being pressed against their respective flanges and surface by said compression of the ring and the resiliency thereof.

8. The joint of claim 6 wherein said material of the liner is resiliently compressible but to a lesser degree than said body, is substantially chemically inert insofar as fluids in said flow passage are concerned, has a low coefficient of friction, and is selected from the group of materials consisting of polymeric plastics, Teflon, and polyethylene; wherein said body completely fills said liner between the flanges thereof; and wherein the material of the body is selected from the group consisting of elastomers, natural rubber, synthetic rubber, and Silastic.

(References on following page)

References Cited by the Examiner

UNITED STATES PATENTS

| | | |
|---|---|---|
| 1,630,012 | 5/1927 | Hutchinson. |
| 1,979,141 | 10/1934 | Clark et al. 285—374 X |
| 2,330,197 | 9/1943 | Allen et al. 285—94 X |
| 2,382,375 | 8/1945 | Allen 285—98 |
| 2,717,025 | 9/1955 | Jelinek 277—228 |
| 2,789,843 | 4/1957 | Bily 285—276 |
| 2,812,960 | 11/1957 | Walsh 285—276 |
| 2,915,349 | 12/1959 | Gomberg 277—165 |
| 2,996,764 | 8/1961 | Ross et al. 18—59 |
| 3,015,859 | 1/1962 | Bloom 18—59 |

FOREIGN PATENTS

| | | |
|---|---|---|
| 287,971 | 4/1928 | Great Britain. |
| 456,144 | 3/1950 | Italy. |

CARL W. TOMLIN, *Primary Examiner.*